United States

Mayer

4,027,301

May 31, 1977

[54] SYSTEM FOR SERIALLY TRANSMITTING PARALLEL DIGITAL DATA

[75] Inventor: Robert Mayer, Ardmore, Pa.

[73] Assignee: Sun Oil Company of Pennsylvania, Philadelphia, Pa.

[22] Filed: Apr. 21, 1975

[21] Appl. No.: 570,298

[52] U.S. Cl. .............................. 340/183; 179/15 A; 340/147 CN; 340/150; 340/163

[51] Int. Cl.² ........................................ H04Q 11/00

[58] Field of Search ............... 340/183, 163, 147 C, 340/147 CN, 147 CV, 167 R, 147 R, 150; 179/15 A, 15 BA

[56] References Cited

UNITED STATES PATENTS

| | | | |
|---|---|---|---|
| 2,870,429 | 1/1959 | Hales | 340/183 X |
| 3,016,516 | 1/1962 | Doersam | 340/147 C |
| 3,132,329 | 5/1964 | Penter | 340/183 |
| 3,145,374 | 8/1964 | Benner et al. | 340/183 |
| 3,293,605 | 12/1966 | Moore | 340/183 X |
| 3,577,187 | 5/1971 | Benson | 340/167 R |
| 3,596,002 | 7/1971 | Ohnsorge et al. | 179/15 BA |
| 3,643,030 | 2/1972 | Sparrendahl | 179/15 BA |
| 3,685,031 | 8/1972 | Cook | 340/183 |
| 3,793,636 | 2/1974 | Clark et al. | 340/183 X |
| 3,812,462 | 5/1974 | Crossland et al. | 340/163 |

OTHER PUBLICATIONS

Analog Devices, Inc., "Analog-Digital Conversion Handbook," June 1972, pp. I-42 to I-47, I-5, 26-29; III-43-45, 50, 51.

*Primary Examiner*—Thomas J. Sloyan
*Attorney, Agent, or Firm*—Donald R. Johnson; J. Edward Hess; William C. Roch

[57] ABSTRACT

A system for transporting parallel digital data in which the parallel digital data is converted to serial digital data, transported as serial digital data, and then reconverted back to parallel digital data. Each parallel digital word to be transported is stepped into a parallel to series shift register which has associated with it a separate digital code to identify the particular digital word. The data in the shift registers is serially stepped out, one shift register at a time, and then transported as serial data to a plurality of series to parallel shift registers. Each series to parallel shift register has associated with it a particular digital code associated with a particular digital word. Each shift register receives the serially transported data, and if the digital code of the shift register matches the digital code of the received word, the data in that particular shift register is stepped out as a parallel digital word.

8 Claims, 3 Drawing Figures

SYSTEM FOR SERIALLY TRANSMITTING PARALLEL DIGITAL DATA

BACKGROUND OF THE INVENTION

The present invention relates generally to a data transmission system, and more particularly pertains to a data transmission system for transporting a plurality of parallel digital words.

In a chemical processing plant, there are many functions which must be controlled simultaneously for the chemical plant to operate properly. These control functions include the setting of many valve positions to control the flow rates of chemicals through the plant. A new type of control valve being utilized in these chemical processing plants requires a twelve bit parallel digital word to control the valve function, which would require thirteen separate wires running between each controller and each valve. It may be readily seen that if many of these valves are used at a given location, the running of many sets of thirteen wires could be quite expensive and bulky. The present invention allows a number of controllers to control a similar number of valves with only two twisted pair shielded wires running between the group of controllers and the group of valves.

SUMMARY OF THE INVENTION

In accordance with a preferred embodiment, a system is disclosed for converting a plurality of parallel digital words to a plurality of serial digital words, transporting the plurality of digital words as serial data, and then converting the serial digital words back to parallel digital words. The system includes a plurality of parallel to series shift registers, one for each digital word to be transported, with each shift register having associated with it a particular digital code. The data in the shift registers is stepped out as serial data, one shift register at a time. The serially transported data is received by a plurality of series to parallel shift registers, each of which has a particular digital code associated with it. If the digital code of the received word matches the digital code of a particular shift register, then the transported digital word is stepped out of that particular shift register as a parallel digital word and utilized as such.

DESCRIPTION OF A PREFERRED EMBODIMENT

Figure 1:
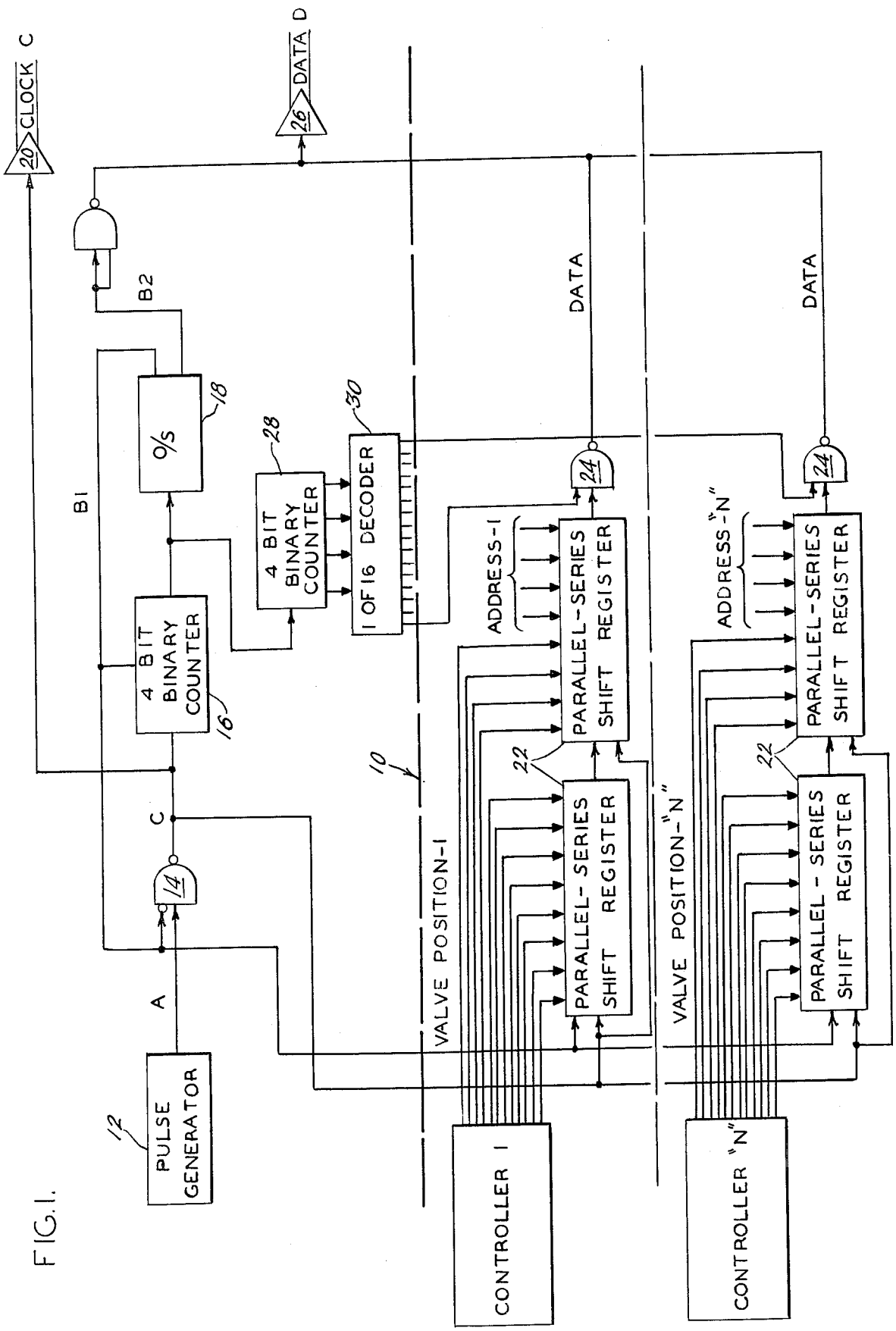
FIG. 1 is a block diagram of one embodiment of the circuitry at the controller area for converting a plurality of parallel digital words to serial digital words, and then transporting the serial digital words sequentially.

Referring to FIG. 1 there is illustrated a block diagram of a preferred embodiment of circuitry at the controller area for converting a plurality of parallel digital words to serial digital words. In FIG. 1 the portion of the circuit above line 10 is common to and controls the conversion of many words from parallel to serial form. Below line 10, each of the sections marked controller "n" is dedicated to the conversion of a particular digital word. Each valve controller, marked CONTROLLER 1 through CONTROLLER N, produces a 12 bit word for each valve with all bits available simultaneously for parallel operation. Each valve needs these twelve bits of information to be available in a parallel or simultaneous mode. If the data is to be transported as serial data, it is necessary to reconvert the data to parallel data at the valve locations. Inasmuch as each controller maintains control of one valve, it is necessary to use an address or identification code for each controller such that each controller operates the correct valve. In the disclosed embodiment, 12 bits of information are necessary to operate each valve, and 4 bits of information are a desirable number of bits for an address code, and accordingly the disclosed embodiment is based on a 16 bit word. In other embodiments, other numbers of control and/or identification bits might be utilized.

Figure 3:
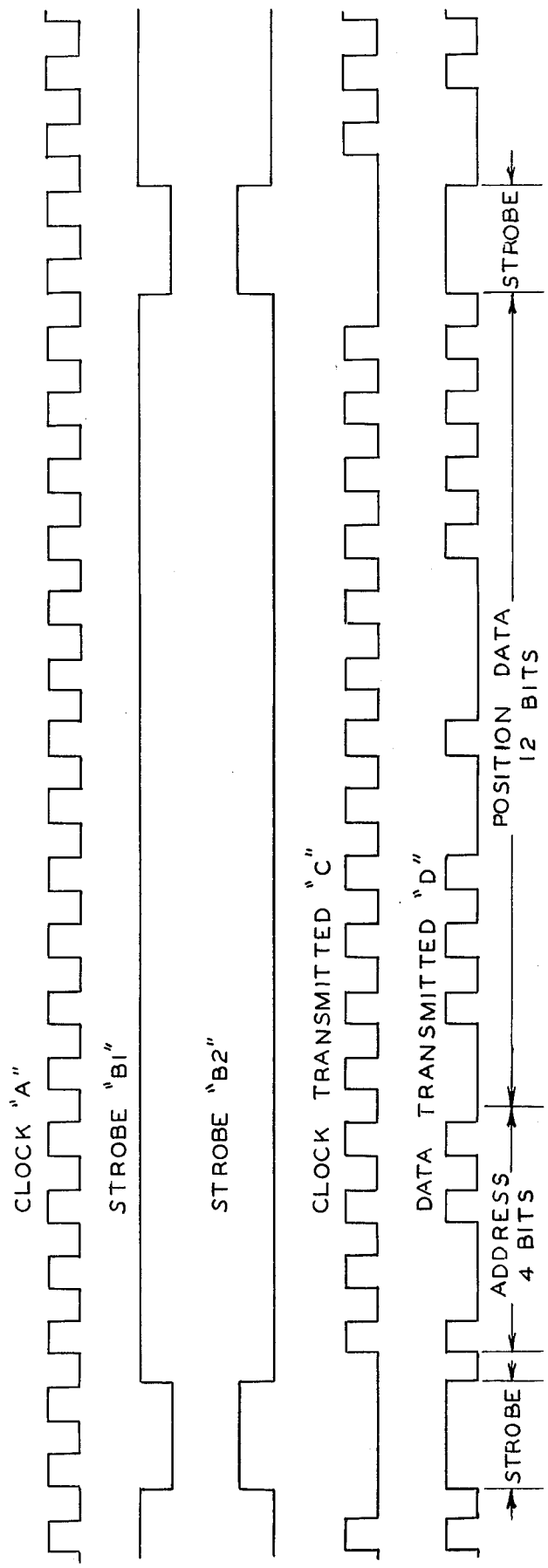
FIG. 3 illustrates a plurality of waveforms which are useful in explaining the operations of the circuits of FIGS. 1 and 2.

Referring to FIG. 1, a pulse generator 12, continuously operating at about 200 hertz, feeds a pulse train, shown as A in FIG. 3, through a NAND gate 14 to a four bit binary counter 16. The output of counter 16, which occurs once every 16 pulses, drives a one-shot multivibrator 18 to produce strobe pulses B1 and B2, also shown in FIG. 3. The strobe pulse B1 is directed to an input terminal of the NAND gate 14, and temporarily blocks the clock pulses from pulsing the binary counter such that the output of the NAND gate 14 looks like waveform C in FIG. 3. Waveform C is directed to the valve locations by a line driver amplifier 20 as shown. The strobe pulse B1 is also directed to the reset input of the four bit binary counter 16 to assure the count starts from zero when the strobe pulse B1 unblocks NAND gate 14. The strobe pulse B2 is directed to the valve locations by a line driver amplifier 26, and performs a function as will be explained with reference to FIG. 3.

Each controller circuit includes a sixteen bit parallel to series shift register 22, which may be simply two serially connected 8 digit shift registers as shown, and a NAND gate 24. Each 16 bit shift register receives twelve of its bits from the particular controller command. The remaining 4 bits are constant and serve as an address code identifying each particular controller. The strobe pulse B1 is also directed as an input to each of the parallel-series shift registers 22 to load the parallel information into the shift registers during the duration of the strobe pulse.

The output of binary counter 16 also feeds a second four bit binary counter 28 which in turn feeds a one of sixteen decoder 30. The net result of this is that every sixteenth pulse into counter 16 activates binary counter 28 to change its count by one, which in turn causes one of sixteen decoder 30 to activate the next one of its sixteen output lines. In this manner, the outputs from the one of sixteen decoder 30 are sequentially activated which in turn sequentially activate each of the NAND gates 24. When the NAND gate for a particular shift register is activated, then the clock pulses received from NAND gate 14 (waveform C) by that shift register cause it to step out the sixteen bit digital word located therein to a line driver amplifier 26 for transmission to the valve locations. In this manner the one of sixteen decoder 24 sequentially activates each of the controller circuits such that only one controller circuit at a time is serially reading out its data.

Figure 2:
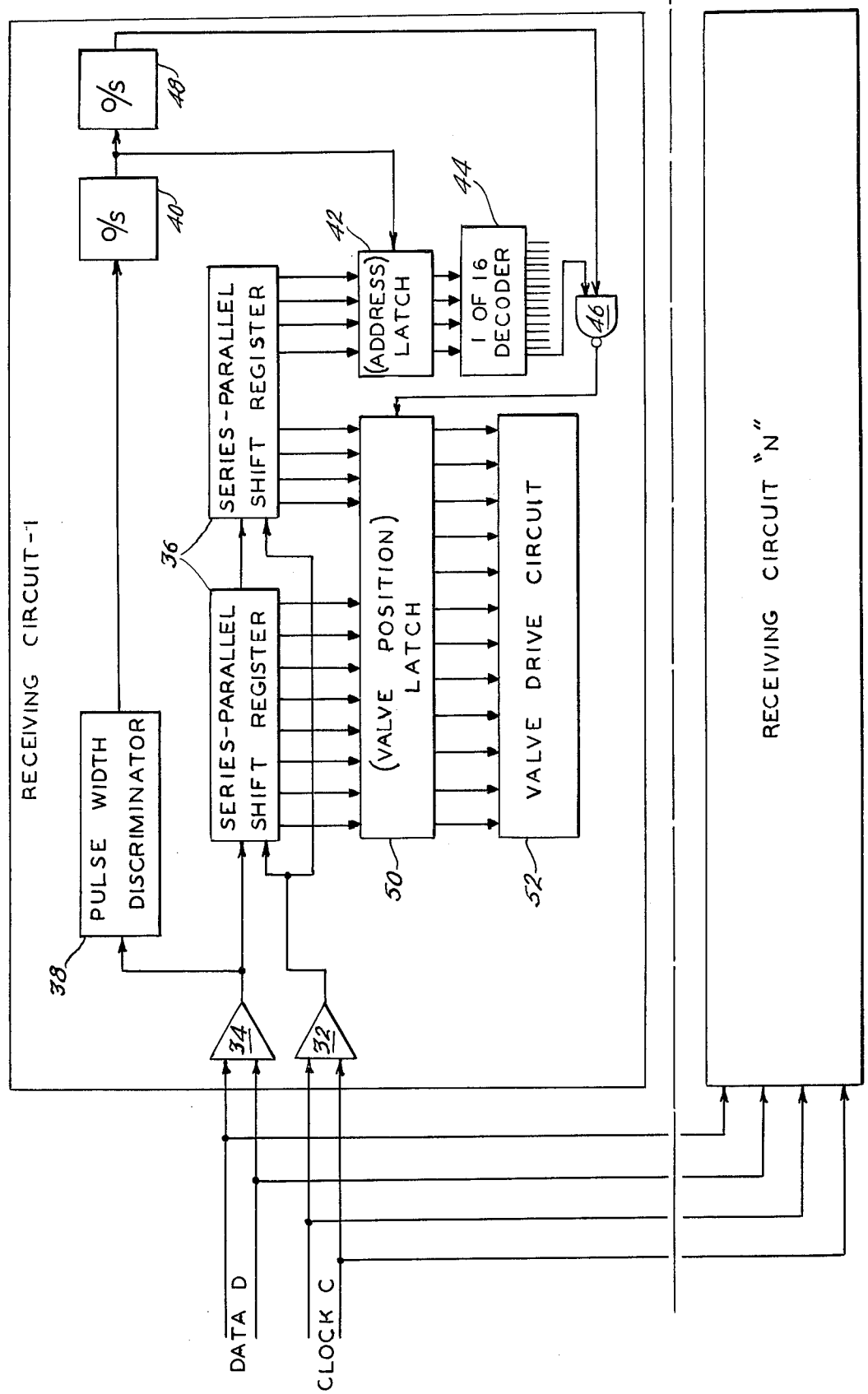
FIG. 2 is a block diagram of one embodiment of the circuitry at each valve location.

Referring to FIG. 2, there is illustrated a block diagram of one embodiment of the receiving circuit at each valve location. Assume for this explanation that one of sixteen decoder 30 has just enabled the NAND gate 24 for controller circuit 1. Assume further that the circuit illustrated in FIG. 2 is the circuit for valve 1 controlled by controller 1. The pulse trains received from line driver amplifiers 20 (waveform C) and 26 (waveform D) are further amplified at the valve location by respectively driver amplifiers 32 and 34. As the data is stepped out of the station 1 shift register 22, it is received by driver amplifier 34 and is stepped into a series to parallel shift register 36 by the clock pulses received by driver amplifier 32. The data received by the series to parallel shift register 36 includes the address of controller 1 followed by the 12 bit word of position data from controller 1. This is followed by a strobe pulse slightly over two clock pulses wide which identifies it as being different from an ordinary bit of data. During the time the 16 bits of informaiton are being received, the output of the register 36 is continuously varying, and accordingly it is necessary to determine the proper time to use the information in the shift register. The strobe pulse is utilized to accomplish this function as follows. A pulse width discriminator 38 discriminates against pulses below a predetermined pulse width, which in the preferred embodiment is approximately one and one half times the width of a clock pulse, and thus discriminator 38 responds only to the strobe pulse. The strobe pulse identifies the end of the information which has been sent in serial form, and during the duration of this strobe pulse the output of the serial to parallel shift register 36 is not changing. The strobe pulse is directed to a timing one-shot multi vibrator 40 the output of which pulses an address latch 42 which transfers the received address to a one of sixteen decoder 44. Since in this example, data for the No. 1 controller is being transmitted, the one of sixteen decoder activates its No. 1 output lead, which for the No. 1 valve circuit is connected to a NAND gate 46. The output of one-shot 40 also activates a second timing one-shot 48 which supplies a second timing input to NAND gate 46. NAND gate 46 then pulses a position latch circuit 50 to cause it to read in the twelve bit positional word in shift register 36 and present that twelve bit word at its output. The 12 bit parallel word is thus available to valve drive circuit 52 to control the No. 1 valve.

The other valve driving circuits would have received the same serial data but would not have been activated as NAND gate 46 in each of those circuits would have been coupled to a different (other than the 1) output of the one of sixteen decoder 44, and accordingly latch 50 would not have been activated. Continuing the cycle on, the next controller circuit to be read out would be the second controlled circuit, and then the third controller circuit in sequence and etc., until the system has completely recycled itself and is back to the first controller circuit again.

Although at least one embodiment of the present invention has been described, the teachings of the this invention will suggest many other embodiments to those skilled in the art.

The invention claimed is:

1. A system for converting a plurality of digital words, each of which has its bits available simultaneously as parallel data, to a plurality of digital words, each of which has its bits available in series as serial data, and then reconverting the serial digital words back to parallel digital words, and comprising:
   a. a digital clock for producing clock pulses;
   b. a plurality of parallel to series shift registers, and including one parallel to series shift register for each of the plurality of digital words;
   c. means fo entering each parallel digital word into the parallel to series shift register provided for that word;
   d. means for entering a separate digital code into each parallel to series shift register, whereby each separate digital code identifies a particular digital word;
   e. means for serially stepping out the digital word and digital code in each shift register;
   f. a plurality of gating means, one coupled to the output of each parallel to series shift register, for gating the output of the shift register when activated;
   g. means for activating each of said plurality of gating means in sequence and one at a time to allow each digital work and code to be gated out serially one at a time and in sequence;
   h. means for producing a strobe timing pulse for each of said gated out serial digital words and codes, which strobe pulse has a duration different from a clock pulse produced by said digital clock; and
   i. means for receiving the serial digital words and codes stepped out by said stepping means and said strobe timing pulses and including a plurality of series to parallel shift registers, each of which is associated with a separate one of the digital codes, means for entering each received serial digital work into every one of said plurality of series to parallel shift registers, means for determining if the received digital code matches the code associated with each series to parallel shift register, pulse width discriminator means, timed by said strobe timing pulse, to signal that the serial word has been entered into every one of said plurality of series to parallel shift registers, and means, responsive to said pulse width discriminator means, for utilizing the parallel digital word in each series to parallel shift register if the code of the received digital word matches the code associated with the particular series to parallel shift register.

2. A system as set forth in claim 1, wherein said strobe timing pulse has a duration longer than a clock pulse produced by said digital clock.

3. A system as set forth in claim 2, wherein said means for activating each of said plurality of gating means in sequence includes a counter means coupled to said digital clock, and a one of N decoder coupled to said counter means and each of said plurality of grating means.

4. A system as set forth in claim 3, wherein said determining means includes a separate one of N decoder coupled to each series to parallel shift register.

5. A system as set forth in claim 1, wherein said determining means includes a separate one of N decoder coupled to each series to parallel shift register.

6. A system as set forth in claim 1, wherein said means for activating each of said plurality of gating means in sequence includes a counter means coupled to said digital clock, and a one of N decoder coupled to said counter means and each of said plurality of gating means.

7. A system as set forth in claim 1 wherein said receiving means is coupled to said digital clock to receive clock pulses from said digital clock.

8. A system as set forth in claim 4 wherein said receiving means is coupled to said digital clock to receive clock pulses from said digital clock.

* * * * *